(12) United States Patent
Yuan et al.

(10) Patent No.: US 9,380,208 B1
(45) Date of Patent: Jun. 28, 2016

(54) IMAGE SENSOR POWER SUPPLY REJECTION RATIO NOISE REDUCTION THROUGH RAMP GENERATOR

(71) Applicant: OMNIVISION TECHNOLOGIES, INC., Santa Clara, CA (US)

(72) Inventors: Bi Yuan, San Jose, CA (US); Quifeng Jin, San Jose, CA (US); Liping Deng, Cupertino, CA (US); Liang Zuo, San Jose, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/685,151

(22) Filed: Apr. 13, 2015

(51) Int. Cl.
    *H04N 5/232* (2006.01)
    *H04N 5/357* (2011.01)
    *H04N 5/378* (2011.01)
    *H04N 5/374* (2011.01)

(52) U.S. Cl.
    CPC ........... *H04N 5/23241* (2013.01); *H04N 5/357* (2013.01); *H04N 5/374* (2013.01); *H04N 5/378* (2013.01)

(58) Field of Classification Search
    CPC ... H04N 5/23241; H04N 5/374; H04N 5/378; H04N 5/357
    See application file for complete search history.

(56) References Cited

U.S. PATENT DOCUMENTS

| | | | | |
|---|---|---|---|---|
| 5,448,056 A * | 9/1995 | Tsuruta | ................... | H03F 3/087 250/208.1 |
| 6,707,492 B1 * | 3/2004 | Itani | ....................... | H04N 5/243 341/139 |
| 2009/0303358 A1 * | 12/2009 | Kawahito | ............... | H04N 5/378 348/255 |
| 2011/0115663 A1 * | 5/2011 | Bogaerts | ............... | H03M 1/123 341/164 |
| 2012/0132789 A1 * | 5/2012 | Ricard | .................. | H04N 5/3745 250/214 A |
| 2013/0075608 A1 * | 3/2013 | Han | ....................... | H04N 5/378 250/336.1 |
| 2015/0249801 A1 * | 9/2015 | Tokunaga | ............... | H04N 5/378 341/155 |
| 2015/0311914 A1 * | 10/2015 | Chae | ....................... | H04N 5/378 250/208.1 |
| 2015/0326805 A1 * | 11/2015 | Scott | ....................... | H04N 5/361 348/243 |

OTHER PUBLICATIONS

U.S. Appl. No. 14/247,855, filed Apr. 8, 2014, Sun et al.

* cited by examiner

*Primary Examiner* — Jason Flohre
(74) *Attorney, Agent, or Firm* — Blakely Sokoloff Taylor & Zafman LLP (57) ABSTRACT

A ramp generator includes a supply voltage sampling circuit coupled to sample a black signal supply voltage during a black signal readout, and an image signal supply voltage of the pixel cell during an image signal readout of a pixel cell. A first integrator circuit receives a buffered reference voltage, and an output of the supply voltage sampling circuit. First and second switches are coupled between the first integrator circuit and a first capacitor to transfer a signal representative of a difference between the image signal supply voltage and the black signal supply voltage to the first capacitor. A second integrator circuit is coupled to the first capacitor to generate an output ramp signal coupled to be received by an analog to digital converter. A starting value of the output ramp signal is adjusted in response to the difference between the image signal and the black signal supply voltage.

21 Claims, 4 Drawing Sheets

IMAGE SENSOR POWER SUPPLY REJECTION RATIO NOISE REDUCTION THROUGH RAMP GENERATOR

BACKGROUND INFORMATION

1. Field of the Disclosure

The present invention relates generally to image sensors. More specifically, examples of the present invention are related to circuits that read out image data from image sensor pixel cells.

2. Background

Image sensors have become ubiquitous. They are widely used in digital cameras, cellular phones, security cameras, as well as, medical, automobile, and other applications. The technology used to manufacture image sensors, and in particular, complementary metal-oxide-semiconductor (CMOS) image sensors, has continued to advance at great pace. For example, the demands of higher resolution and lower power consumption have encouraged the further miniaturization and integration of CMOS image sensors.

In a conventional CMOS active pixel sensor, image charge is transferred from a photosensitive device (e.g., a photo diode) and is converted to a voltage signal inside the pixel cell on a floating diffusion node. In conventional CMOS image sensors, an amplifier such as a source follower circuit is used in the pixel cells to amplify the signal on the floating diffusion node to output the image data to the bit lines, which are read by the column read out circuitry. Limited by the design and layout constraints of pixel cells, the source follower circuits can suffer from an unsatisfactory power supply rejection ratio, such as −20 dB. An unsatisfactory power supply rejection ratio can present many challenges, including noise from power supplies that can enter into the output signal path. Furthermore, the ripple of power supplies can cause unwanted horizontal ripple in the captured image.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

Examples in accordance with the teaching of the present invention describe a ramp generator coupled to provide a ramp signal to an analog to digital converter included in an image sensor readout circuit. In one example, the ramp generator includes a supply voltage sampling circuit coupled to sample a black signal supply voltage of a pixel cell during a black signal readout of the pixel cell, and to sample an image signal supply voltage of the pixel cell during an image signal readout of the pixel cell. The difference between the image signal supply voltage and the black signal supply voltage is used to determine the amount of ripple in the power supply. A first integrator circuit is coupled an output of the supply voltage sampling circuit. First and second switches are coupled between the first integrator circuit and a first capacitor. The first and second switches are switched to transfer a signal representative of the difference between the image signal supply voltage and the black signal supply voltage to the first capacitor. A second integrator circuit coupled to the first capacitor to generate an output ramp signal that is coupled to be received by an analog to digital converter in the image sensor readout circuit. The starting value of the output ramp signal is adjusted in response to the difference between the image signal supply voltage and the black signal supply voltage. By adjusting the starting value of the output ramp signal in response to the difference between the image signal supply voltage and the black signal supply voltage, the ripple in the supply voltage is compensated, which therefore provides an improved power supply rejection ratio in the image sensor in accordance with the teachings of the present invention.

Figure 1:
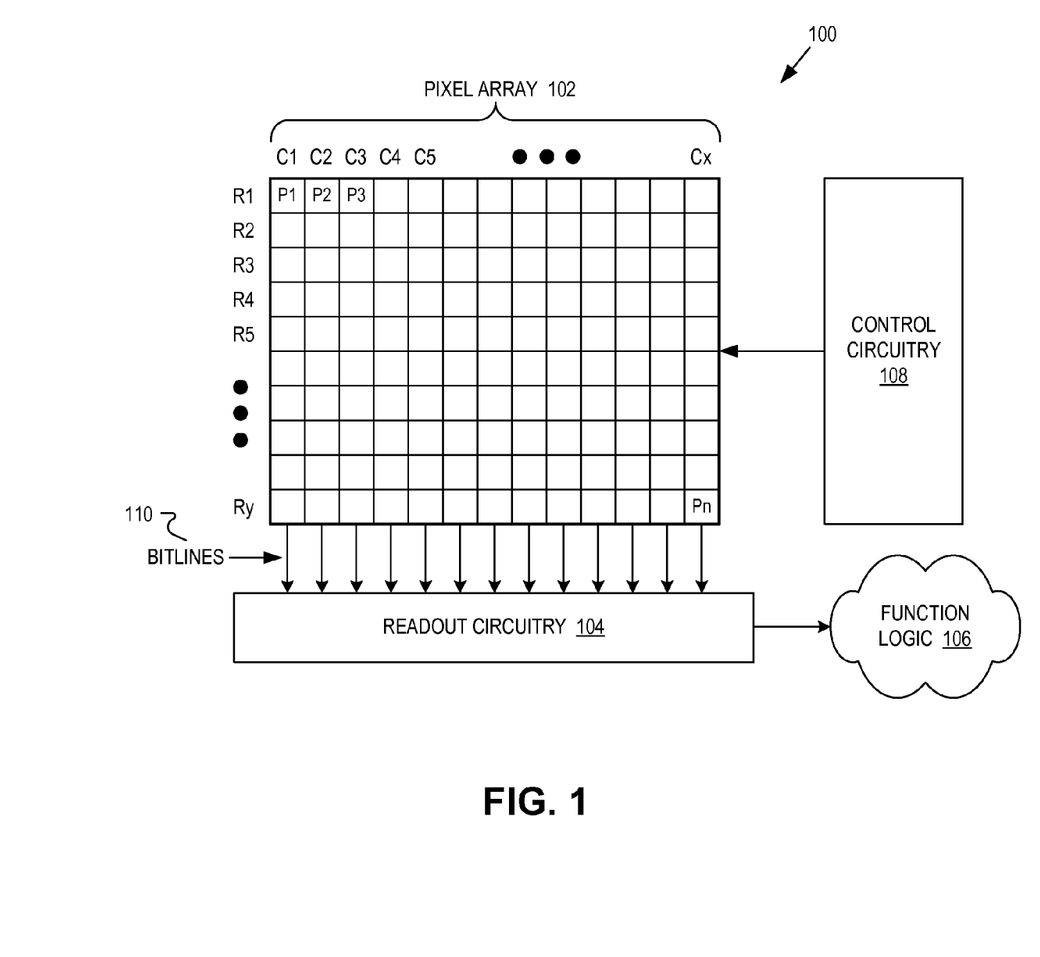
FIG. 1 is a is a block diagram illustrating an example imaging system including a pixel array having pixel cells and readout circuitry to improve the power supply rejection ratio in bitlines in accordance with the teachings of the present invention.

To illustrate, FIG. 1 is a block diagram illustrating an example imaging system including a pixel array having pixel cells and readout circuitry to improve the power supply rejection ratio in bitlines in accordance with the teachings of the present invention. As shown, FIG. 1 depicts one example of an image sensing system 100 that includes readout circuitry 104 with a ramp generator that provides an improved power supply rejection ratio in accordance with the teachings of the present invention. As shown in the depicted example, imaging system 100 includes pixel array 102 coupled to control circuitry 108, and readout circuitry 104, which is coupled to function logic 106.

In one example, pixel array 102 is a two-dimensional (2D) array of imaging sensors or pixel cells (e.g., pixel cells P1, P2, P3, Pn). In one example, each pixel cell is a CMOS imaging pixel. As illustrated, each pixel cell is arranged into a row (e.g., rows R1 to Ry) and a column (e.g., column C1 to Cx) to acquire image data of a person, place, object, etc., which can then be used to render a 2D image of the person, place, object, etc.

In one example, after each pixel cell has accumulated its image data or image charge, the image data is read out by readout circuitry 104 through column bitlines 110 and then transferred to function logic 106. In various examples, readout circuitry 104 may also include additional amplification circuitry, sampling circuitry, additional analog-to-digital (ADC) conversion circuitry, or otherwise. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column bitlines 110 (illustrated) or may read out the image data using a variety of other techniques (not illustrated), such as a serial readout or a full parallel readout of all pixels simultaneously.

In one example, control circuitry 108 is coupled to pixel array 102 to control operational characteristics of pixel array 102. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
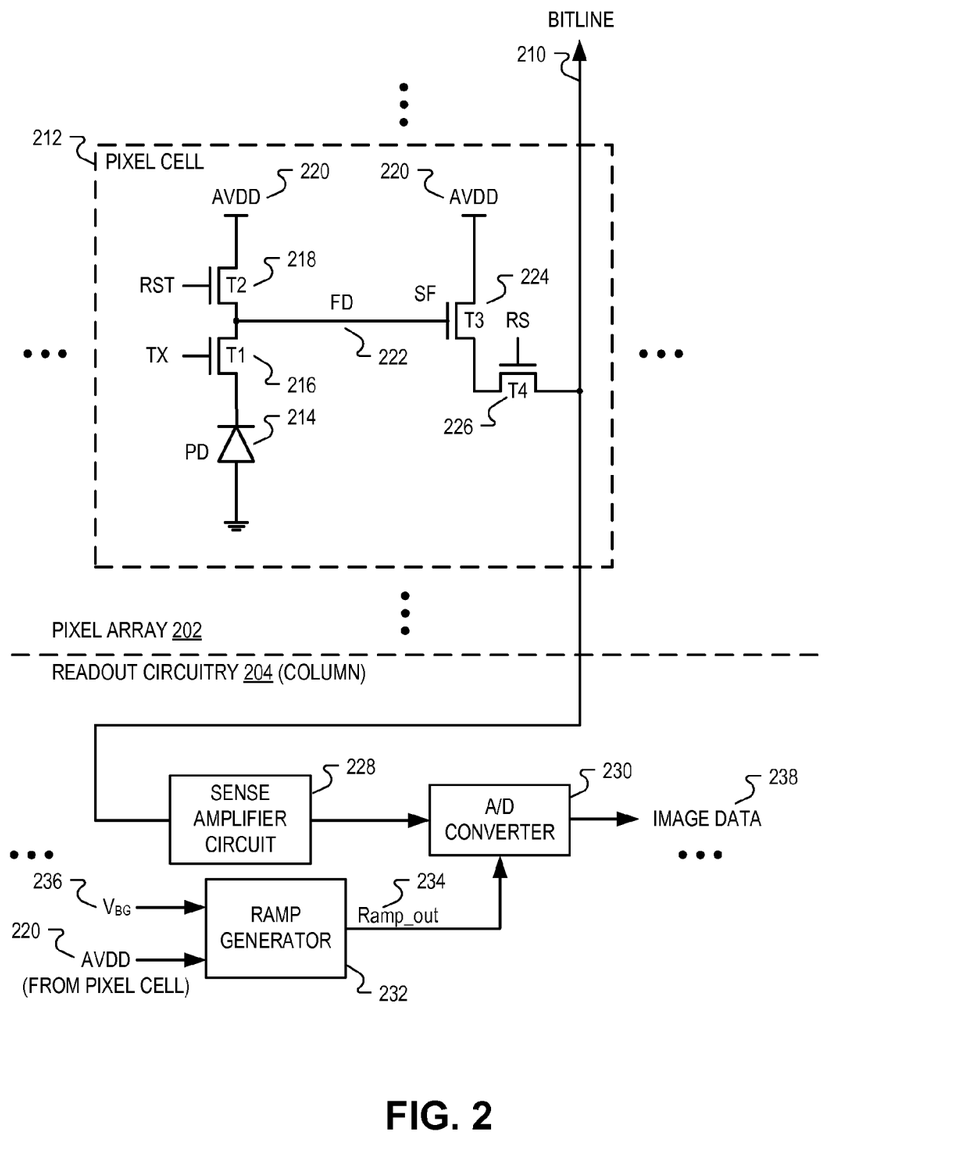
FIG. 2 is a schematic illustrating one example of a pixel cell coupled to readout circuitry including a ramp generator coupled to an analog to digital converter that improves the power supply rejection ratio of the pixel cell by compensating for the variation of the AVDD power supply of the pixel cell in accordance with the teachings of the present invention.

FIG. 2 is a schematic illustrating one example of a pixel cell coupled to readout circuitry including a ramp generator coupled to an analog to digital converter that improves the power supply rejection ratio of the pixel cell by compensating for the ripple or variation of the AVDD power supply of the pixel cell in accordance with the teachings of the present invention. In particular, FIG. 2 shows a schematic of one example of a pixel cell 212 a pixel array 202 coupled to a column of readout circuitry 204 having a readout architecture that compensates for ripples or variations in the AVDD power supply of the pixel cells 212 of pixel array 202 in accordance with the teachings of the present invention. It is noted that the pixel cell 212, pixel array 202, and readout circuitry 204 of FIG. 2 may be examples pixel cells P1, P2, Pn, pixel array 102, and readout circuitry 104 of FIG. 1, and that similarly named and numbered elements referenced below are therefore coupled and function similar to as described above.

In the example depicted in FIG. 2, pixel cell 212 is illustrated as being a four-transistor (4T) pixel cell. It is appreciated that pixel cell 212 is one possible example of pixel circuitry architecture for implementing each pixel cell within pixel array 202. However, it should be appreciated that other examples in accordance with the teachings of the present invention are not necessarily limited to 4T pixel architectures. One having ordinary skill in the art having the benefit of the present disclosure will understand that the present teachings are also applicable to 3T designs, 5T designs, and various other pixel cell architectures in accordance with the teachings of the present invention.

In the example depicted in FIG. 2, pixel cell 212 includes a photosensitive element, which may also be referred to as a photodiode (PD) 214 to accumulate image charge, a transfer transistor T1 216, a reset transistor T2 218, a floating diffusion (FD) node 222, an amplifier transistor, which is illustrated as a source-follower (SF) transistor T3 224, and a row select transistor T4 226. During operation, transfer transistor T1 216 receives a transfer signal TX, which selectively transfers the image charge accumulated in photosensitive element PD 214 to floating diffusion FD node 222.

As shown in the illustrated example, reset transistor T2 218 is coupled between a supply voltage AVDD 220 and the floating diffusion node FD 222 to reset levels in the pixel cell 212 (e.g., discharge or charge the floating diffusion node FD 222 and the photosensitive element PD 214 to a preset voltage) in response to a reset signal RST. The floating diffusion node FD 222 is coupled to control the gate of amplifier transistor SF T3 224. Amplifier transistor SF T3 224 is coupled between the supply voltage AVDD 220 and row select transistor RS T4 226. Amplifier transistor SF T3 224 operates as a source-follower amplifier providing a high impedance connection to the floating diffusion node FD 222. Row select transistor RS T4 226 selectively couples the image data output of pixel cell 212 to the readout column bitline 210 in response to a row select signal RS. In the illustrated example, bitline 210 is coupled to selectively readout image data from a column of the pixel array 202.

The example depicted in FIG. 2 also illustrates a column of readout circuitry 204, which includes a sense amplifier circuit 228 that is coupled to bitline 210 to read out image data from pixel cell 212 of pixel array 202. In one example, the image data that is sensed with sense amplifier circuit 228 may be sampled, and then output to an analog to digital converter 230, which converts the sensed analog image data received from sense amplifier circuit 228.

In one example, the analog to digital converter 230 is also coupled to receive a reference ramp signal Ramp_out 234 from a ramp generator 232. During the conversion process of analog to digital converter 230, the reference ramp signal Ramp_out 234 decreases (or increases) from a starting value. In one example, analog to digital converter 230 outputs a digital image data 238 signal after the conversion process is complete in response to the reference ramp signal Ramp_out 234 signal and the analog image data signal received from sense amplifier circuit 228. In one example, the digital image data 238 may then be received by function logic 106, as shown in FIG. 1.

As will be discussed in greater detail below, variations or ripples that occur in the AVDD supply voltage 220 may be compensated for by ramp generator 232 by adjusting a starting value of the reference ramp signal Ramp_out 234 to improve power supply rejection ratio in accordance with the teachings of the present invention. In the example, the greater the ripple in the AVDD supply voltage 220, the greater the adjustment to the starting value of the reference ramp signal Ramp_out 234 in accordance with the teachings of the present invention.

In one example, ramp generator 232 generates the reference ramp signal Ramp_out 234 in response to a reference bandgap voltage $V_{BG}$ 236 and the AVDD supply voltage 220 received from a pixel cell 220 of pixel array 202. As will be discussed, the variation or ripple in the AVDD supply voltage 220 is determined by ramp generator 232 by finding the difference in the AVDD supply voltage 220 between when a black signal is readout from pixel array 202, and when an image signal is readout from the pixel array 202 in accordance with the teachings of the present invention.

Figure 3:
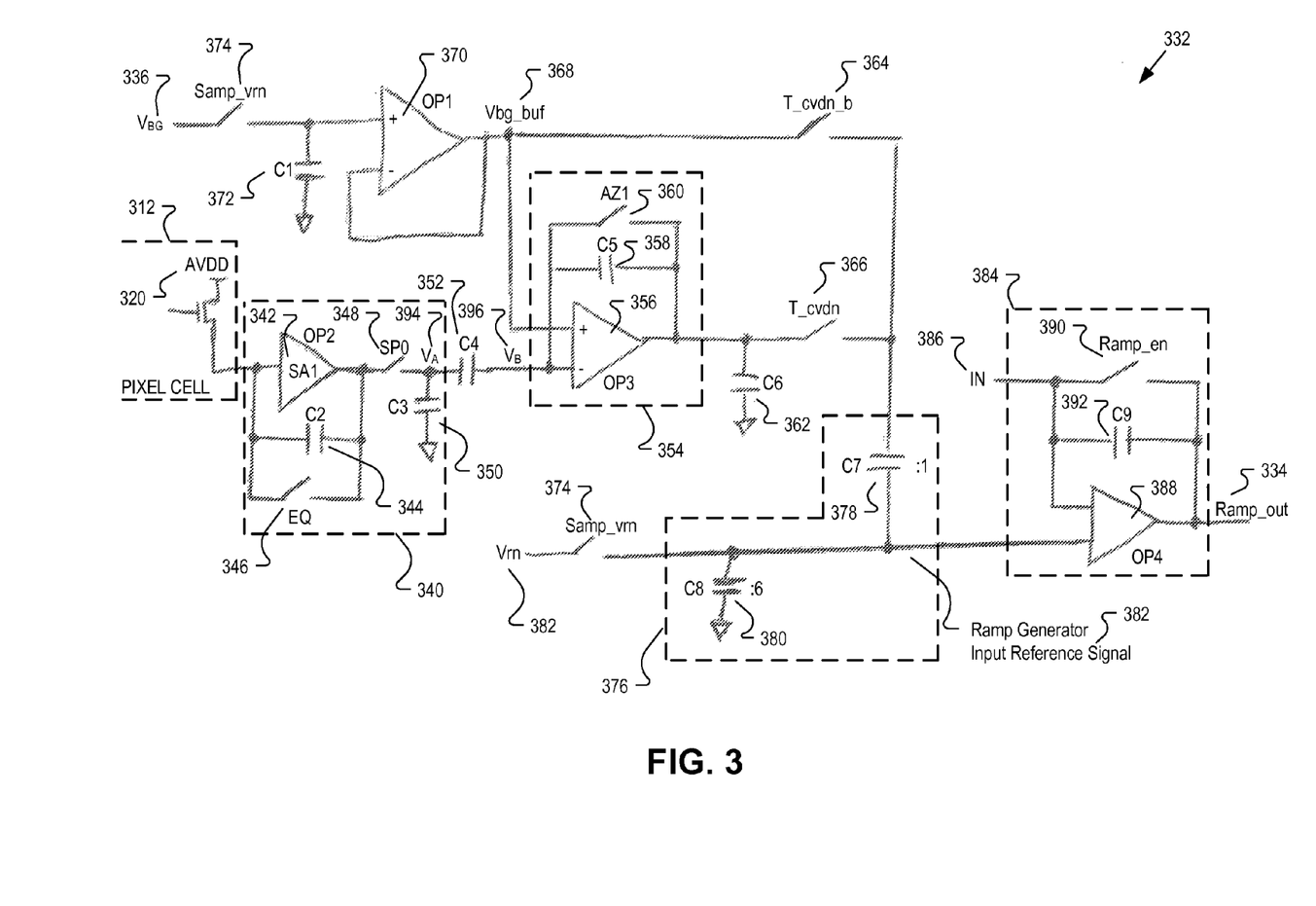
FIG. 3 is a schematic illustrating one example of a ramp generator included in readout circuitry of an image sensing system that improves the power supply rejection ratio in bit lines in accordance with the teachings of the present invention.

To illustrate, FIG. 3 is a schematic illustrating one example of a ramp generator 332 included in readout circuitry of an image sensing system that improves the power supply rejection ratio in bitlines in accordance with the teachings of the present invention. It is noted that the ramp generator 332 of FIG. 3 may be an example of ramp generator 232 of FIG. 2, and that similarly named and numbered elements referenced below are therefore coupled and function similar to as described above.

As shown in the depicted example, ramp generator 332 includes a supply voltage sampling circuit 340 that is coupled to a pixel cell 312 of an image sensor to sample a black signal supply voltage value of the AVDD supply voltage 320 of the pixel cell 312 during a black signal readout of the pixel cell 312. In addition, the supply voltage sampling circuit 340 is also adapted to sample an image signal supply voltage value of the AVDD supply voltage 320 of the pixel cell 312 during an image signal readout of the pixel cell 312. The difference, which is referred to as ΔAVDD in this disclosure, can then be determined:

$$\Delta AVDD = V\_avdd\_signal - V\_avdd\_black \quad \text{(Equation 1)}$$

where V_avdd_signal is the image signal supply voltage value of the AVDD supply voltage 320 of the pixel cell 312 during an image signal readout of the pixel cell 312, and where V_avdd_black is black signal supply voltage value of the AVDD supply voltage 320 of the pixel cell 312 during a black signal readout of the pixel cell 312. In the example, the ΔAVDD difference between the image signal supply voltage and the black signal supply voltage can be used to determine the ripple or variation in the AVDD power supply of the pixel cell 312.

In one example, supply voltage sampling circuit 340 includes a sense amplifier SA1 342 that is coupled to receive the supply voltage AVDD 320 from pixel cell 312. In the example, sense amplifier SA1 342 is a single input/single output amplifier OP2, having a single inverting input terminal and no non-inverting terminal (i.e., no "+" terminal). Thus, in the example, sense amplifier SA1 342 has a negative gain, a1, which is used to match the real signal path.

The example depicted in FIG. 3 also shows that supply voltage sampling circuit 340 includes an equalizing switch EQ 346, that is coupled between an input of the sense amplifier SA1 342 and an output of sense amplifier SA1 342. In operation, the equalizing switch EQ 346 may be closed or turned ON to equalize the output of sense amplifier SA1 342 with the input of sense amplifier SA1 342 prior to the sampling of the black signal supply voltage (i.e., prior to sampling V_avdd_black).

In the depicted example, FIG. 3 also shows that supply voltage supply voltage sampling circuit 340 includes a supply voltage sampling switch SP0 348 that is coupled between an output of the sense amplifier SA1 342 and an output capacitor C3 350 of the sense amplifier SA1 342.

As shown in the example depicted in FIG. 3, a first integrator circuit 354 has a first input that is coupled to receive a buffered reference voltage Vbg_buf 368. In one example, buffered reference voltage Vbg_buf 368 is provided with a voltage-follower coupled operational amplifier OP1 370 in response to a reference bandgap voltage $V_{BG}$ 336. For instance, as shown in the example, the reference bandgap voltage $V_{BG}$ 336 is sampled onto a capacitor C1 372, which is coupled to a non-inverting ("+") terminal of operational amplifier OP1 370 in response to a Samp_vrn 374 signal. The output of operational amplifier OP1 370 is coupled to the inverting ("−") terminal of operational amplifier OP1 370, which therefore configures operational amplifier OP1 370 as a voltage-follower. As such, the buffered reference voltage Vbg_buf 368 is provided at the output of operational amplifier OP1 370 to the first input of first integrator circuit 354.

In the example shown in FIG. 3, the first integrator circuit 354 also includes a second input that is coupled to an output of the supply voltage sampling circuit 340. In particular, the depicted example shows that first integrator circuit 354 includes a first integrator-coupled operational amplifier OP3 356 including a first input that is capacitively coupled to the supply voltage sampling circuit 340 through a third capacitor C4 352. In the example, the first input of first integrator-coupled operational amplifier OP3 356 is an inverting ("−") input. The first input of the first integrator-coupled operational amplifier OP3 356 is further capacitively coupled to an output of the first integrator-coupled operational amplifier OP3 356 through a fourth capacitor C5 358. As shown in the example, a second input of first integrator-coupled operational amplifier OP3 356 is coupled to receive the buffered reference voltage Vbg_buf 368. In the example, the second input of first integrator-coupled operational amplifier OP3 356 is a non-inverting ("+") input. In the depicted example, a first integrator output capacitor C6 362 is coupled to the output of the first integrator circuit 354, as shown.

The example shown in FIG. 3 illustrates that the first integrator circuit 354 also includes a first integrator equalizing switch AZ1 360 that is coupled between the first input (e.g., the inverting terminal of first integrator-coupled operational amplifier OP3 356) and the output of the first integrator-coupled operational amplifier OP3 356. As will be discussed in further detail below, the first integrator equalizing switch AZ1 360 is adapted to be ON while the black signal supply voltage (i.e., V_avdd_black) is sampled. In addition, the first integrator equalizing switch AZ 1 360 is adapted to be OFF after the black signal supply voltage is sampled.

The example illustrated in FIG. 3 also shows a first switch T_cvdn_b 364 is coupled between the second input of the first integrator circuit 354 and a first capacitor C7 378. A second switch T_cvdn 366 is coupled between an output of the first integrator circuit 354 and the first capacitor C7 378. As will be discussed below, the first switch T_cvdn_b 364 and the second switch T_cvdn 366 are adapted (to be ON and OFF) to transfer a signal representative of ΔAVDD (i.e., the difference between the image signal supply voltage and the black signal supply voltage) to the first capacitor C7 378.

In operation, the first switch T_cvdn_b 364 is adapted to be ON when second switch T_cvdn 366 is OFF. Similarly, the first switch T_cvdn_b 364 is adapted to be OFF when the second switch T_cvdn 366 is ON. A signal representative of the black signal supply voltage (i.e., V_avdd_black) is transferred to the first capacitor C7 378 when the first switch T_cvdn_b 364 is ON. A signal representative of ΔAVDD (i.e., V_avdd_signal−V_avdd_black) is transferred to the first capacitor C7 378 when the second switch T_cvdn 366 is ON.

As shown in the example depicted in FIG. 3, the first capacitor C7 378 is coupled to a second capacitor C8 380. The first capacitor C7 378 and second capacitor C8 380 are included in a capacitive voltage divider 376. In the example, a capacitance ratio of the first capacitor C7 378 and the second capacitor C8 380 of the capacitive voltage divider 376 matches a ratio of the supply voltage AVDD 320 of the pixel cell 312 to a bitline output ratio of the pixel cell 312. For instance, in one example, the capacitance ratio of first capacitor C7 378 to second capacitor C8 380 is 1:6, as illustrated in FIG. 3.

As shown in the example, a second integrator circuit 384 is coupled to the first capacitor C7 378 and the second capacitor C8 380. The second integrator circuit 384 is coupled to generate an output ramp signal Ramp_out 334 that is coupled to be received by an analog to digital converter, which may for example be analog to digital converter 230 illustrated in FIG. 2. It is appreciated that the output ramp signal Ramp_out 334 of FIG. 3 may therefore be an example of the reference ramp signal Ramp_out 234 of FIG. 2. As will be discussed, a starting value of the output ramp signal 334 is adjusted in response to ΔAVDD, which compensates for ripples or variations in the AVDD supply voltage 320 and therefore improves power supply rejection ratio in accordance with the teachings of the present invention.

In the example depicted in FIG. 3, second integrator circuit 384 includes a second integrator-coupled operational amplifier OP4 388 that including a first input coupled to the first capacitor C7 378 to receive a ramp generator input reference signal 382. A second input of the second integrator-coupled operational amplifier OP4 388 is capacitively coupled to an output of the second integrator-coupled operational amplifier OP4 388 through a fifth capacitor C9 392. In one example, the second input of second integrator-coupled operational amplifier OP4 388 is further coupled to receive a constant input signal IN 386. For instance, in one example, the constant input signal IN 386 is coupled to be received from a constant current source. In the example, the output of second integrator-coupled operational amplifier OP4 388 is coupled to provide the output ramp signal Ramp_out 334, which in one example is coupled to be received by an analog to digital converter, such as for example analog to digital converter 230 of FIG. 2.

In the example depicted in FIG. 3, a second integrator equalizing switch Ramp_en 390 coupled between the second input and the output of second integrator-coupled operational amplifier OP4 388. In the example, the second integrator equalizing switch Ramp_en 390 is adapted to be ON to equalize the second input and the output of the second integrator equalizing switch Ramp_en 390. In the example, operation of the output ramp signal Ramp_out 334 may be enabled or disabled in response to the second integrator equalizing switch Ramp_en 390.

Figure 4:
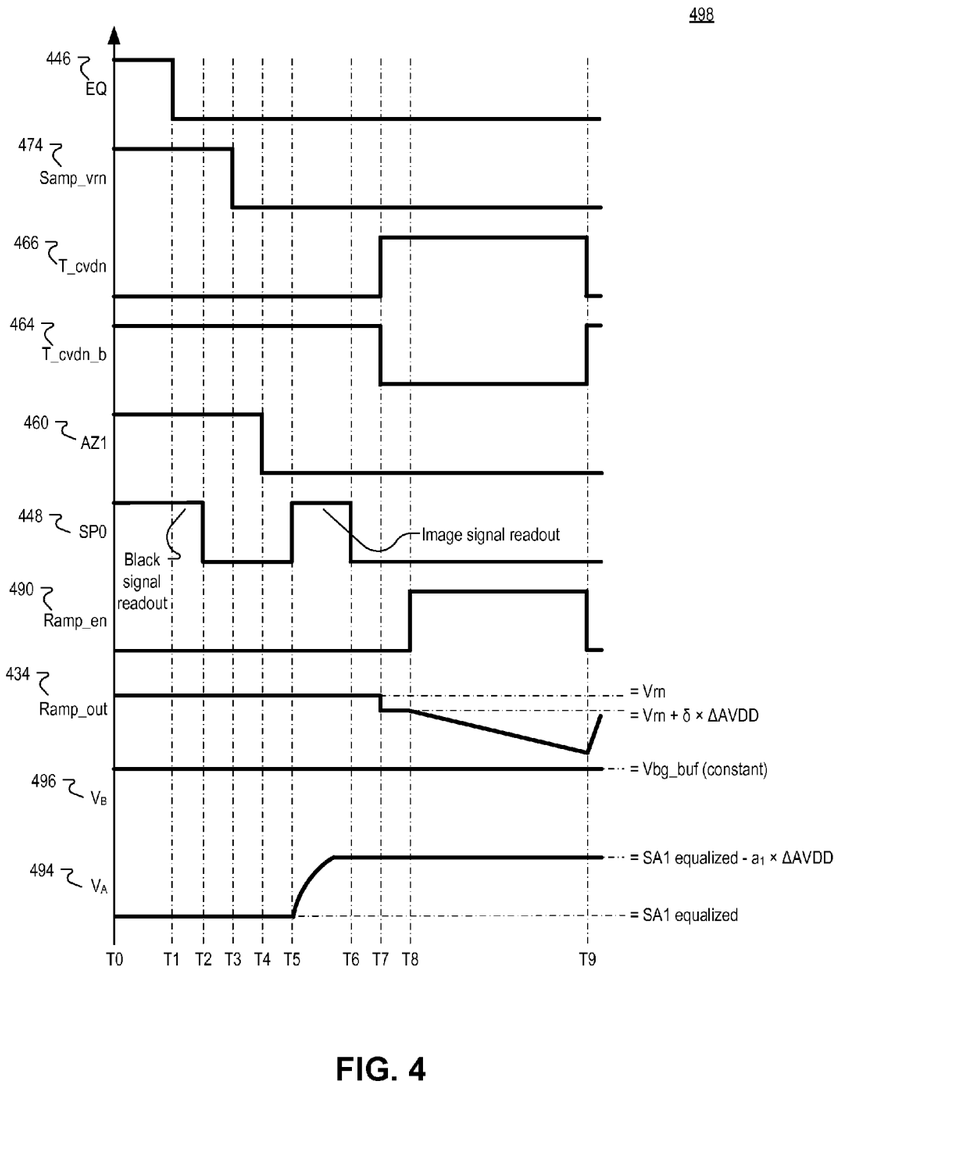
FIG. 4 illustrates a timing diagram of signals in an example ramp generator included in readout circuitry of an image sensing system that improves the power supply rejection ratio in bit lines in accordance with the teachings of the present invention.

FIG. 4 illustrates a timing diagram 490 of signals in an example ramp generator included in readout circuitry of an image sensing system that improves the power supply rejection ratio in bit lines in accordance with the teachings of the present invention. It is noted that the signals illustrated in timing diagram 490 of FIG. 4 may be examples of corresponding signals found in elements described with respect to ramp generator 332 of FIG. 3 during operation. Accordingly, it is appreciated that similarly named and numbered elements referenced below are therefore coupled and function similar to as described above. In addition, it is appreciated that the digital logic signals are described below using the nomenclature high/low, or on/off to indicate asserted/de-asserted, opened/closed, etc. It is noted of course that one have ordinary skill in the art will appreciate that in other examples, the polarity of the logic circuitry could be reversed and therefore invert the signals described herein to realize similar or equivalent function in accordance with the teachings of the present invention.

As shown in timing diagram 498, at time T0, the EQ 446 signal is high, which therefore initializes the voltage at the output of the sense amplifier SA1 342 to be equal to the input of sense amplifier SA1 342. This SA1 equalized voltage is the initial voltage at time T0 of $V_A$ 494, which is the voltage across output capacitor C3 350 of the sense amplifier SA1 342.

The AZ1 360 signal is also high at time T0, which therefore initializes the voltage at the output of the first integrator-coupled operational amplifier OP3 356 to be equal to the first input (i.e., the inverting input) of first integrator-coupled operational amplifier OP3 356. In the example, the first integrator-coupled operational amplifier OP3 356 equalizes the voltage difference between the first and second inputs (i.e., the inverting and non-inverting inputs) during operation. Since the second input of first integrator-coupled operational amplifier OP3 356 is coupled to buffered reference voltage Vbg_buf 368, the first input is therefore also set to buffered reference voltage Vbg_buf 368. This buffered reference voltage Vbg_buf 368 is therefore the constant voltage of VB 496 as shown, which is the voltage at the first input of first integrator-coupled operational amplifier OP3 356.

At time T1, the EQ 446 signal changes to low, which therefore enables the sense amplifier SA1 342 to begin sampling the AVDD supply voltage 320 with the switch SP0 signal 448 high. In the example, the pixel 312 is reading out a black signal at this time, and the signal being sampled from the AVDD supply voltage 320 is therefore a black signal supply voltage, which may also be referred to as V_avdd_black.

At time T2, the switch SP0 signal 448 changes to low, which therefore completes the sampling of the black signal supply voltage, V_avdd_black, onto the output capacitor C3 350 of the sense amplifier SA1 342.

At time T3, the Samp_vrn 474 signal changes from high to low, which therefore completes the sampling of a Vrn voltage onto second capacitor C8 380, as well as the sampling of the reference bandgap voltage $V_{BG}$ 336 onto the capacitor C1 372. In the depicted example, it is noted that the Vrn voltage sampled onto second capacitor C8 380 is the voltage of the Ramp_out 434 signal as shown.

At time T4, the AZ1 460 signal changes from high to low, which therefore enables the first integrator-coupled operational amplifier OP3 356 to integrate. In the example, with the AZ1 460 signal now off, the first switch T_cvdn_b 464 signal on, and the second switch T_cvdn 466 off, the black signal supply voltage (i.e., V_avdd_black) is transferred to the first capacitor C7 378.

At time T5, the SP0 448 changes from low to high again, which therefore enables the enables the sense amplifier SA1 342 to begin sampling the AVDD supply voltage 320 again. In the example, the pixel 312 is reading out an image signal at this time, and the signal being sampled from the AVDD supply voltage 320 is therefore an image signal supply voltage, which may also be referred to as V_avdd_signal. As the image signal supply voltage V_avdd_signal is being sampled onto output capacitor C3 350, the voltage $V_A$ 494 being to rise as shown.

At time T6, the switch SP0 signal 448 changes to low, which therefore completes the sampling of the image signal supply voltage, V_avdd_signal, onto the output capacitor C3

350 of the sense amplifier SA1 342. At this time, the voltage $V_A$ 494 across output capacitor C3 350 has been changed to $$V_A = SA1\text{ equalized} - a1 \times \Delta AVDD \quad \text{(Equation 2)}$$

where a1 is the absolute value of the gain of the sense amplifier SA1 342 that is used to match the real signal path, and $\Delta AVDD$ is the difference between the image signal supply voltage (V_avdd_signal) and the black signal supply voltage (V_avdd_black). In addition, at this time, when the AZ1 460 signal is off, the output of the first integrator-coupled operational amplifier OP3 356 may be described as follows:

$$Vop3\_out = Vbg\_buf - \Delta AVDD \times (C4/C5) \quad \text{(Equation 3)}$$

where Vop3_out is the voltage at the output of the first integrator-coupled operational amplifier OP3 356, Vbg_buf is the buffered reference voltage Vbg_buf 368, $\Delta AVDD$ is the difference between the image signal supply voltage (V_avdd_signal) and the black signal supply voltage (V_avdd_black), C4 is the capacitance of third capacitor C4 352, and C5 is the capacitance of fourth capacitor C5 358.

At time T7, the first switch T_cvdn_b 464 signal changes from high to low, and the second switch T_cvdn 466 signal changes from low to high. In the example, with the AZ1 460 signal off, the difference between the image signal supply voltage and the black signal supply voltage (i.e., $\Delta AVDD = V\_avdd\_signal - V\_avdd\_black$) is transferred to the first capacitor C7 378. As shown in FIG. 4, with $\Delta AVDD$ now transferred to the first capacitor C7 378 at time T7, the voltage of the Ramp_out 434 signal is adjusted from Vrn to $$Ramp\_out = Vrn + \delta \times \Delta AVDD \quad \text{(Equation 4)}$$

where Vrn was the voltage of the Ramp_out 424 signal prior to being adjusted in response to $\Delta AVDD$. The multiplier $\delta$ is determined according to $$\delta = \frac{C7}{C7 + C8} \quad \text{(Equation 5)}$$

where C7 is the capacitance of the first capacitor C7 378, and C8 is the capacitance of the second capacitor C8 380 of the capacitive voltage divider 376, which is used to match the ratio of the supply voltage AVDD to bitline output ratio. It is appreciated therefore that the greater $\Delta AVDD$ is, the greater the AVDD supply voltage ripple, and the greater the adjustment to the starting value of the Ramp_out 424 signal to compensate for variations in the power supply and improve the power supply rejection ratio in accordance with the teachings of the present invention. Furthermore, if there is no $\Delta AVDD$, then there is no AVDD supply voltage ripple, and there is no adjustment to the starting value of the Ramp_out 424 signal.

At time T8, the ramp enable Ramp_en 490 signal is turned on which enables the Ramp_out 424 signal to begin ramping as shown. In one example, the Ramp_en 490 signal is enabled to provide a reference signal to the analog to digital converter, such as for example analog to digital converter 230 of FIG. 2, to convert analog image data from a pixel array 202 to a digital image data 238.

At time T9, the ramp enable Ramp_en 490 signal is turned off, and the analog to digital conversion is complete with an improved power supply ratio in accordance with the teachings of the present invention. In the example, the first switch T_cvdn_b 464 signal changes from low back to high, and the second switch T_cvdn 466 signal changes from high back to low as shown to prepare the ramp generator of the next analog to digital conversion in accordance with the teachings of the present invention.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A ramp generator for use in readout circuitry of an image sensor, comprising:
    a supply voltage sampling circuit coupled to a pixel cell of the image sensor to sample a black signal supply voltage of the pixel cell during a black signal readout of the pixel cell, and to sample an image signal supply voltage of the pixel cell during an image signal readout of the pixel cell;
    a first integrator circuit having a first input coupled to receive a buffered reference voltage, and a second input coupled to an output of the supply voltage sampling circuit;
    a first switch coupled between the first input of the first integrator circuit and a first capacitor;
    a second switch coupled between an output of the first integrator circuit and the first capacitor, wherein the first and second switches are switched to transfer a signal representative of a difference between the image signal supply voltage and the black signal supply voltage to the first capacitor; and
    a second integrator circuit coupled to the first capacitor, wherein the second integrator circuit is coupled to generate an output ramp signal coupled to be received by an analog to digital converter, wherein a starting value of the output ramp signal is adjusted in response to the difference between the image signal supply voltage and the black signal supply voltage.

2. The ramp generator of claim 1 wherein the first switch is adapted to be ON when the second switch is OFF, and wherein the first switch is adapted to be OFF when the second switch is ON, wherein a signal representative of the black signal supply voltage is transferred to the first capacitor when the first switch is ON, and wherein the signal representative of the difference between the image signal supply voltage and the black signal supply voltage is transferred to the first capacitor when the second switch is ON.

3. The ramp generator of claim 1 wherein the first capacitor is coupled to a second capacitor, wherein the first and second capacitors are included in a capacitive voltage divider, wherein a capacitance ratio of the first capacitor and the second capacitor of the capacitive voltage divider matches a ratio of the supply voltage of the pixel cell to a bitline output of the pixel cell.

4. The ramp generator of claim 1 wherein the supply voltage sampling circuit includes a sense amplifier coupled to receive the supply voltage of the pixel cell, wherein the sense amplifier has a negative gain.

5. The ramp generator of claim 4 wherein the supply voltage sampling circuit further includes an equalizing switch coupled between an input of the sense amplifier and an output of the sense amplifier to equalize the output of the sense amplifier with the input of the sense amplifier prior to the sampling of the black signal supply voltage.

6. The ramp generator of claim 4 wherein the supply voltage sampling circuit further includes a supply voltage sampling switch coupled between an output of the sense amplifier and an output capacitor of the sense amplifier.

7. The ramp generator of claim 1 further comprising a voltage-follower coupled operational amplifier coupled to provide the buffered reference voltage to the first input of the first integrator circuit in response to a bandgap voltage.

8. The ramp generator of claim 1 wherein the first integrator circuit includes:
a first integrator-coupled operational amplifier including a first input capacitively coupled to the supply voltage sampling circuit through a third capacitor, wherein the first input of the first integrator-coupled operational amplifier is further capacitively coupled to an output of the first integrator-coupled operational amplifier through a fourth capacitor, wherein a second input of the first integrator-coupled operational amplifier is coupled to receive the buffered reference voltage; and
a first integrator equalizing switch coupled between the first input and the output of the first integrator-coupled operational amplifier, wherein the first integrator equalizing switch is adapted to be ON while the black signal supply voltage is sampled, and wherein the first integrator equalizing switch is adapted to be OFF after the black signal supply voltage is sampled.

9. The ramp generator of claim 1 further comprising a first integrator output capacitor coupled to the output of the first integrator circuit.

10. The ramp generator of claim 1 wherein the second integrator circuit includes:
a second integrator-coupled operational amplifier including a first input coupled to the first capacitor, wherein a second input of the second integrator-coupled operational amplifier is capacitively coupled to an output of the second integrator-coupled operational amplifier through a fifth capacitor, wherein the second input of the second integrator-coupled operational amplifier is further coupled to receive a constant input signal, wherein the output of the second integrator-coupled operational amplifier is coupled to generate the output ramp signal coupled to be received by the analog to digital converter; and
a second integrator equalizing switch coupled between the second input and the output of the second integrator-coupled operational amplifier, wherein the second integrator equalizing switch is adapted to be ON to equalize the second input and the output of the second integrator-coupled operational amplifier.

11. An imaging system, comprising:
a pixel array including a plurality of pixel cells organized into a plurality of rows and columns for capturing image data;
control circuitry coupled to the pixel array to control operation of the pixel array; and
readout circuitry coupled to the pixel array to readout the image data from the pixel cells, the readout circuitry including:
a sense amplifier circuit coupled to a bitline coupled to one of the plurality of columns of the pixel array to sample image data;
an analog to digital converter coupled to the sense amplifier circuit to convert the image data sensed by the sense amplifier circuit; and
a ramp generator coupled to generate an output ramp signal coupled to be received by the analog to digital converter, the ramp generator including:
a supply voltage sampling circuit coupled to the pixel array to sample a black signal supply voltage of the pixel array during a black signal readout of the pixel array, and to sample an image signal supply voltage of the pixel array during an image signal readout of the pixel array;
a first integrator circuit having a first input coupled to receive a buffered reference voltage, and a second input coupled to an output of the supply voltage sampling circuit;
a first switch coupled between the first input of the first integrator circuit and a first capacitor;
a second switch coupled between an output of the first integrator circuit and the first capacitor, wherein the first and second switches are switched to transfer a signal representative of a difference between the image signal supply voltage and the black signal supply voltage to the first capacitor; and
a second integrator circuit coupled to the first capacitor, wherein the second integrator circuit is coupled to generate the output ramp signal coupled to be received by the analog to digital converter, wherein a starting value of an output ramp signal adjusted in response to the difference between the image signal supply voltage and the black signal supply voltage.

12. The imaging system of claim 11 further comprising function logic coupled to the readout circuitry to store the image data readout from the plurality of pixel cells.

13. The imaging system of claim 11 wherein the first switch is adapted to be ON when the second switch is OFF, and wherein the first switch is adapted to be OFF when the second switch is ON, wherein a signal representative of the black signal supply voltage is transferred to the first capacitor when the first switch is ON, and wherein the signal representative of the difference between the image signal supply voltage and the black signal supply voltage is transferred to the first capacitor when the second switch is ON.

14. The imaging system of claim 11 wherein the first capacitor is coupled to a second capacitor, wherein the first and second capacitors are included in a capacitive voltage divider, wherein a capacitance ratio of the first capacitor and the second capacitor of the capacitive voltage divider matches a ratio of the supply voltage of the pixel array to a bitline output of the pixel array.

15. The imaging system of claim 11 wherein the supply voltage sampling circuit includes a sense amplifier coupled to receive the supply voltage of the pixel array, wherein the sense amplifier has a negative gain.

16. The imaging system of claim 15 wherein the supply voltage sampling circuit further includes an equalizing switch coupled between an input of the sense amplifier and an output of the sense amplifier to equalize the output of the sense amplifier with the input of the sense amplifier prior to the sampling of the black signal supply voltage.

17. The imaging system of claim 15 wherein the supply voltage sampling circuit further includes a supply voltage sampling switch coupled between an output of the sense amplifier and an output capacitor of the sense amplifier.

18. The imaging system of claim 11 wherein the ramp generator further includes a voltage-follower coupled operational amplifier coupled to provide the buffered reference voltage to the first input of the first integrator circuit in response to a bandgap voltage.

19. The imaging system of claim 11 wherein the first integrator circuit includes:
- a first integrator-coupled operational amplifier including a first input capacitively coupled to the supply voltage sampling circuit through a third capacitor, wherein the first input of the first integrator-coupled operational amplifier is further capacitively coupled to an output of the first integrator-coupled operational amplifier through a fourth capacitor, wherein a second input of the first integrator-coupled operational amplifier is coupled to receive the buffered reference voltage; and
- a first integrator equalizing switch coupled between the first input and the output of the first integrator-coupled operational amplifier, wherein the first integrator equalizing switch is adapted to be ON while the black signal supply voltage is sampled, and wherein the first integrator equalizing switch is adapted to be OFF after the black signal supply voltage is sampled.

20. The imaging system of claim 11 wherein the ramp generator further includes a first integrator output capacitor coupled to the output of the first integrator circuit.

21. The imaging system of claim 11 wherein the second integrator circuit includes:
- a second integrator-coupled operational amplifier including a first input coupled to the first capacitor, wherein a second input of the second integrator-coupled operational amplifier is capacitively coupled to an output of the second integrator-coupled operational amplifier through a fifth capacitor, wherein the second input of the second integrator-coupled operational amplifier is further coupled to receive a constant input signal, wherein the output of the second integrator-coupled operational amplifier is coupled to generate the output ramp signal coupled to be received by the analog to digital converter; and
- a second integrator equalizing switch coupled between the second input and the output of the second integrator-coupled operational amplifier, wherein the second integrator equalizing switch is adapted to be ON to equalize the second input and the output of the second integrator-coupled operational amplifier.

* * * * *